United States Patent [19]

Seibel

[11] Patent Number: 5,244,738
[45] Date of Patent: Sep. 14, 1993

[54] METAL ARTICLE COATED WITH A COMPOSITION FOR INHIBITING CORROSION

[75] Inventor: Lawrence P. Seibel, Kenosha, Wis.

[73] Assignee: The Dexter Corporation, Windsor Locks, Conn.

[21] Appl. No.: 13,639

[22] Filed: Feb. 4, 1993

Related U.S. Application Data

[62] Division of Ser. No. 753,930, Sep. 3, 1991.

[51] Int. Cl.$^5$ ............................................. B32B 15/08
[52] U.S. Cl. ................................... 428/418; 428/457; 428/460; 106/14.37; 106/14.38; 106/14.42; 106/14.43
[58] Field of Search .................. 428/457, 418, 460; 106/14.37, 14.38, 14.43, 14.42; 252/394, 395

[56] References Cited

U.S. PATENT DOCUMENTS

| | | | |
|---|---|---|---|
| 3,932,144 | 1/1976 | Matsubara et al. | 428/460 |
| 4,124,554 | 11/1978 | Fry | 428/460 |
| 4,212,781 | 7/1980 | Evans et al. | 428/460 |
| 4,501,787 | 2/1985 | Marchetti et al. | 428/460 |
| 4,612,049 | 9/1986 | Berner et al. | 106/14.13 |
| 4,696,763 | 9/1987 | Bentley et al. | 252/391 |
| 4,719,036 | 11/1988 | Kubley | 252/391 |
| 4,818,777 | 4/1989 | Braig | 524/83 |
| 4,894,091 | 1/1990 | Braig et al. | 106/14.16 |
| 4,981,759 | 1/1991 | Nakatani et al. | 428/416 |
| 5,069,805 | 12/1991 | Braig | 252/391 |

FOREIGN PATENT DOCUMENTS 0259255 8/1986 European Pat. Off.

OTHER PUBLICATIONS

R. A. Behrens, A. Braig, "A New Organic Collosion Inhibitor for Coatings", Water–Borne & Higher Solids Coatings Symposium, Feb. 3–5, 1988.

Primary Examiner—Mark L. Bell
Assistant Examiner—Anthony J. Green
Attorney, Agent, or Firm—Marshall, O'Toole, Gerstein, Murray & Borun

[57] ABSTRACT

A coating composition that inhibits corrosion of metal substrates, a method of inhibiting corrosion of a metal substrate with a corrosion-inhibiting coating composition, and a metal article that resists corrosion are disclosed. The corrosion-inhibiting coating composition comprises: (a) a high molecular weight epoxy resin; (b) a phenolic resin; (c) an organic corrosion inhibitor having the general structural formula

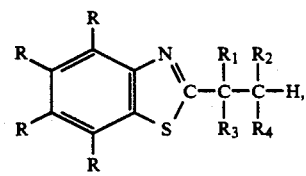

wherein each R is selected, independently, from the group consisting of hydrogen, alkyl, haloalkyl, alkoxy, alkylthio, alkylsulfonyl, cycloalkyl, phenyl, alkylphenyl, phenylalkyl, halo, cyano, nitro, carboxyl, carboxyalkyl, hydroxy, amino, and carbamoyl, and wherein $R_1$, $R_2$, $R_3$ and $R_4$ are selected, independently, from the group consisting of hydrogen, alkyl, hydroxyalkyl, haloalkyl, alkoxyalkyl, carboxyalkyl, carboxyl, phenyl, and phenylalkyl, and wherein at least one of the $R_1$, $R_2$, $R_3$ and $R_4$ groups is a carboxyl group; and (d) a suitable nonaqueous carrier.

11 Claims, No Drawings

METAL ARTICLE COATED WITH A COMPOSITION FOR INHIBITING CORROSION

CROSS-REFERENCE TO RELATED APPLICATIONS

This is a divisional of U.S. application Ser. No. 753,930, filed Sep. 3, 1991.

FIELD OF THE INVENTION

The present invention relates to a method of inhibiting corrosion of a metal substrate; to a coating composition that, after curing, effectively inhibits corrosion of a metal substrate, demonstrates excellent flexibility and demonstrates excellent adhesion both to the metal substrate and to a variety of topcoats applied over the cured corrosion-inhibiting composition; and to a metal article that effectively resists corrosion, said metal article having at least one surface coated with an adherent layer of the cured corrosion-inhibiting composition. The corrosion-inhibiting coating composition comprises: (a) a high molecular weight epoxy resin; (b) a relatively low amount of a phenolic resin; (c) an organic corrosion-inhibitor having the general structural formula (I):

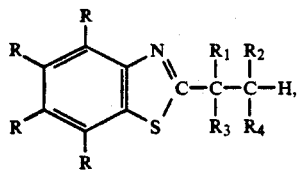

wherein each R is selected, independently, from the group consisting of hydrogen, alkyl, haloalkyl, alkoxy, alkylthio, alkylsulfonyl, cycloalkyl, phenyl, alkylphenyl, phenylalkyl, halo, cyano, nitro, carboxyl, carboxyalkyl, hydroxy, amino, and carbamoyl, and wherein $R_1$, $R_2$, $R_3$ and $R_4$ are selected, independently, from the group consisting of hydrogen, alkyl, hydroxyalkyl, haloalkyl, alkoxyalkyl, carboxyalkyl, carboxyl, phenyl, and phenylalkyl, and wherein at least one of the $R_1$, $R_2$, $R_3$ and $R_4$ groups is a carboxyl group; and (d) a suitable nonaqueous carrier.

BACKGROUND OF THE INVENTION

It is well-known that an aqueous solution in contact with an untreated metal substrate can result in corrosion of the untreated metal substrate. Therefore, a metal article, such as a metal container or a metal closure for a glass or plastic container, like a food product, is rendered corrosion resistant in order to retard or eliminate interactions between the aqueous product and the metal article. Generally, corrosion resistance is imparted to the metal article, or to a metal substrate in general, by passivating the metal substrate, or by coating the metal substrate with a corrosion-inhibiting coating.

Investigators continually have sought improved coatings to reduce or eliminate the corrosion of metal substrate. For example, investigators have sought to improve the imperviousness of the coating in order to prevent corrosion-causing ions, oxygen molecules and water molecules from contacting and interacting with the metal substrate. Imperviousness can be improved by providing a thicker, more flexible and more adhesive coating, but often, improving one particular advantageous property is achieved at the expense of another advantageous property. For example, if the adhesive properties of a coating is improved, the flexibility of the coating can be adversely affected.

In addition, practical considerations limit the thickness, adhesive properties and flexibility of a coating applied to a metal substrate. For example, thick coatings are expensive, require a longer cure time, can be esthetically unpleasing and can adversely affect the process of stamping and molding the coated metal substrate into a useful metal article. Similarly, the coating should be sufficiently flexible such that the continuity of the coating is not destroyed during stamping and molding of the metal substrate into the desired shape of the metal article.

Corrosion-inhibiting compounds have been included in coating compositions to interact, either chemically or electrochemically, with the corrosion-causing agents or with the metal surface in order to retard the corrosion process. Traditionally, chromate compounds and lead compounds were used to retard and inhibit corrosion of metal substrates. However, both types of compounds introduce environmental and toxicological concerns making their use in coatings, and especially in coatings for metal articles that contact food, undesirable.

Inorganic extender pigments, such as calcium carbonate, talc, aluminum flake or mica, also have been included in coating compositions to inhibit the ability of water, oxygen and other corrosion-causing agents from contacting and interacting with the metal substrate. Investigators recently have used organic corrosion-inhibiting compounds to retard the corrosion of metal substrates Originally, the zinc and lead salts of a hydroxy- or mercapto-containing five or six membered heterocyclic compound, such as the zinc or lead salts of 2-mercaptobenzothiazole, were utilized. However, such corrosion-inhibiting compounds did not overcome the environmental and toxicological disadvantages of including a heavy metal in the composition.

Berner et al., in U.S. Pat. No. 4,612,049, disclose organic corrosion inhibiting compounds that can be used in a coating composition for metal substrates. Berner et al. generally teach that certain benzoxazoles, benzthiazoles and benzimidazoles can be combined with a resinous film-forming binder to provide a coating composition that inhibits corrosion of metal substrates. The Berner et al. patent teaches general corrosion-inhibiting compositions that include an organic corrosion inhibitor, but the Berner et al. patent does not teach or suggest particular corrosion-inhibiting coating compositions that further demonstrate, after curing, the properties of improved flexibility and excellent adhesion to both the metal substrate and to a variety of topcoats applied over the cured corrosion-inhibiting composition. As will be discussed more fully hereinafter, the improved adhesion between the cured corrosion-inhibiting composition and a variety of topcoats allows a more efficient processing of the coated metal substrate into a shaped metal article, like a metal container or a metal closure, wherein the shaped metal article effectively resists corrosion resulting from contact with aqueous liquids, and especially with acidic aqueous liquids that include volatile acids.

Braig U.S. Pat. No. 4,818,777 and Braig et al. U.S. Patent No. 4,894,091 also disclose organic corrosion-inhibiting compounds useful in coatings and related compositions. The publication, "A New, Organic Corrosion Inhibitor for Coatings", presented by R.A. Behrens and A. Braig, at the Water-Borne and Higher Solids Coatings Symposium, New Orleans, LA., Feb. 3.5, 1988, describes the corrosion process, and the coatings and corrosion-inhibiting compounds used to retard or eliminate the corrosion of metal substrates.

Although the above-identified patents and publication disclose effective organic corrosion inhibiting compounds, these references do not teach particular coating compositions that, after curing,: (1) effectively inhibit corrosion, (2) demonstrate improved adhesion both to a metal substrate and to a variety of types of polymeric topcoats applied over the cured corrosion-inhibiting composition, and (3) demonstrates substantially improved flexibility even after extended cure times of about one hour at 400° F. As an added advantage, it has been found that a present corrosion-inhibiting coating composition, after application as a primer coat on a surface of a metal substrate and subsequent curing, effectively inhibits corrosion of the metal substrate, even if only a single topcoat is applied over the cured primer coat. Conventionally, because prior primer coats either did not exhibit a sufficient corrosion inhibiting ability or exhibit sufficient adhesion to a variety of topcoats and metal substrates, a primer coat was chosen, in part, for its ability to adhere to a particular topcoat, and often two topcoats were applied over the primer coat to achieve sufficient corrosion inhibition. Accordingly, because of improved corrosion-inhibiting properties and because of improved flexibility and adhesion to a variety of types of topcoats, a corrosion-inhibiting coating composition of the present invention has a more universal range of applications, such as for the interior coating of a metal container for holding food products and for the primer coat on the interior of a metal closure for a glass or plastic container for holding food products.

SUMMARY OF THE INVENTION

The present invention is directed to a coating composition that, after curing, effectively inhibits corrosion of metal substrates, exhibits improved flexibility and exhibits excellent adhesion both to metal substrates and to a variety of polymer-based compositions used as topcoats over the cured corrosion-inhibiting composition. The present corrosion-inhibiting coating composition comprises: (a) a high molecular weight epoxy resin; (b) a relatively low amount of a phenolic resin; (c) an organic corrosion inhibitor having the general structural formula (I):

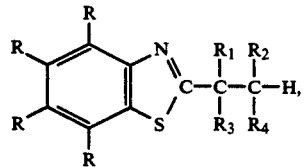

wherein each R is selected, independently, from the group consisting of hydrogen, alkyl, haloalkyl, alkoxy, alkylthio, alkylsulfonyl, cycloalkyl, phenyl, alkylphenyl, phenylalkyl, halo, cyano, nitro, carboxyl, carboxyalkyl, hydroxy, amino, and carbamoyl, and wherein $R_1$, $R_2$, $R_3$ and $R_4$ are selected, independently, from the group consisting of hydrogen, alkyl, hydroxyalkyl, haloalkyl, alkoxyalkyl, carboxyalkyl, carboxyl, phenyl, and phenylalkyl, and wherein at least one of the $R_1$, $R_2$, $R_3$ and $R_4$ groups is a carboxyl group; and (d) a suitable nonaqueous carrier. The corrosion-inhibiting composition further can include: (e) a low molecular weight crosslinking epoxy resin. The corrosion-inhibiting coating composition effectively inhibits corrosion of ferrous and non-ferrous metal substrates when the composition is applied to a surface of the metal substrate, then cured for a sufficient time and at a sufficient temperature to provide a crosslinked corrosion-inhibiting coating.

In particular, the present corrosion-inhibiting coating composition comprises: (a) from about 55% to about 78.5%, by weight of nonvolatile material as (a), (b) and (c), of a high molecular weight epoxy resin, such as an epoxy resin having a molecular weight of about 15,000 to about 80,000, and preferably of about 30,000 to about 80,000; (b) from about 20% to about 40%, by weight of nonvolatile material as (a), (b) and (c), of a phenolic resin; (c) from about 1.5% to about 5%, by weight of nonvolatile material as (a), (b) and (c), of an organic corrosion inhibitor having general structural formula (I), and preferably an organic corrosion inhibitor having the general structural formula (II):

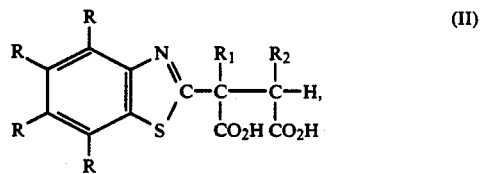

wherein R, $R_1$, and $R_2$ are defined as above for a compound of general structural formula (I).

Components (a), (b) and (c) are dispersed in a suitable nonaqueous carrier, such that the total coating composition includes from about 20% to about 40%, by weight of the total composition, of components (a), (b) and (c). Other optional components, such as a pigment or (e) a low molecular weight crosslinking epoxy resin, also can be included in the composition, and accordingly increase the weight percent of total nonvolatile material in the composition to above about 40% by weight of the total coating composition.

As used here and hereinafter, the term "corrosion-inhibiting coating composition" is defined as the composition including the epoxy resin, the phenolic resin, the organic corrosion-inhibitor, and any optional ingredients dispersed in the nonaqueous carrier; the term "corrosion-inhibiting coating" is defined as the adherent polymeric coating resulting from curing a corrosion-inhibiting coating composition. Therefore, one important aspect of the present invention is to provide a coating composition that effectively inhibits the corrosion of ferrous and nonferrous metal substrates The corrosion-inhibiting coating composition, after application to a metal substrate, and subsequent curing at a sufficient temperature for a sufficient time, provides an adherent layer of a corrosion-inhibiting coating that effectively inhibits corrosion, exhibits improved flexibility and exhibits improved adhesion both to the metal substrate and to a variety of types of topcoats applied over the cured corrosion-inhibiting coating. Because of these improved properties, a single topcoat can be applied over the cured corrosion-inhibiting coating, as opposed to the conventional two topcoats, thereby providing economies in time, material and machinery in the coating of a metal substrate. The corrosion-inhibiting coating comprises the epoxy resin, the phenolic resin and the organic corrosion inhibitor essentially in the amounts these ingredients are present in the corrosion-inhibiting coating composition, expressed as nonvolatile material.

In accordance with another important aspect of the present invention, the corrosion-inhibiting coating composition demonstrates improved flexibility and improved adhesion to the metal substrate after curing. The improved adhesion of the cured corrosion-inhibiting coating to the metal substrate further improves the corrosion-inhibiting properties of the coating composition, and the improved flexibility facilitates processing of the coated metal substrate into a coated metal article, like in molding or stamping process steps, such that the corrosion-inhibiting coating remains in continuous and intimate contact with the metal substrate. Surprisingly, the improved flexibility is demonstrated even after an unusually long cure time of about 60 minutes at 400° F.

In accordance with yet another important aspect of the present invention, the cured corrosion-inhibiting coating not only demonstrates an improved adhesion to the metal substrate, but the corrosion-inhibiting coating also demonstrates an improved adhesion to a variety of different types of topcoats. Conventional corrosion-inhibiting compositions including an epoxy resin and a phenolic resin, after application to a metal substrate and subsequent curing, were limited to the type of topcoat applied thereover. However, the improved intercoat adhesion demonstrated by the present corrosion-inhibiting coating composition, after curing, permits the application of a variety of types of topcoats thereover, such as an epoxy-phenolic topcoat, a polyester topcoat, a dispersion vinyl topcoat or a polyester/vinyl topcoat.

A greater freedom in selecting a type of topcoat to apply over the corrosion-inhibiting coating expands the number of useful applications for a corrosion-inhibiting coating composition of the present invention. For example, by choosing a suitable topcoat, the metal substrate coated on at least one surface with a cured corrosion-inhibiting composition of the present invention can be formed into a metal closure for a glass or plastic container that holds food products. Conventionally, a particular type of topcoat was applied over a particular primer in order to achieve sufficient intercoat adhesion. The present corrosion-inhibiting composition overcomes this disadvantage, and provides a composition that exhibits sufficient intercoat adhesion with a variety of types of topcoats. In addition, the coated metal substrate can be formed into a metal container for food products. Such metal containers do not require a topcoat over the cured corrosion-inhibiting coating.

These and other aspects and advantages of the present invention will become apparent from the following detailed description of the preferred embodiments.

DETAILED DESCRIPTION OF THE PREFERRED EMBODIMENTS

A corrosion-inhibiting coating composition of the present invention, after curing, provides a corrosion-inhibiting coating that effectively inhibits the corrosion of metal substrates, such as, but not limited to, aluminum, iron, steel and copper. The corrosion-inhibiting coatings also demonstrate a significantly improved adhesion to the metal substrate; an improved adhesion to a variety of types of topcoats; an improved flexibility; and an improved ability to tolerate long cure times without losing flexibility.

In general, a present corrosion-inhibiting coating composition comprises: (a) a high molecular weight epoxy resin; (b) a relatively low amount of phenolic resin; (c) an organic corrosion inhibitor having the general structural formula (I); and (d) a suitable nonaqueous carrier. The corrosion-inhibiting composition further can include: (e) a low molecular weight crosslinking epoxy resin to provide a more fully crosslinked corrosion-inhibiting coating. In addition, the corrosion-inhibiting coating composition can include optional ingredients that improve the esthetics of the composition, that facilitate processing of the composition, or that improve a functional property of the composition. The individual composition ingredients are described in more detail below.

(a) Epoxy Resin

The coating composition of the present invention includes a high molecular weight epoxy resin in an amount of about 55% to about 78.5%, by weight of nonvolatile material as (a), (b) and (c). Preferably, the composition includes from about 60% to about 70% of the epoxy resin, by weight of nonvolatile material as (a), (b) and (c). An epoxy resin useful in the present composition has a high molecular weight of about 15,000 to about 80,000, and preferably is a branched epoxy resin having a molecular weight of about 30,000 to about 80,000. To achieve the full advantage of the present invention, the high molecular weight epoxy resin is branched and has a molecular weight in the range of about 40,000 to about 75,000.

Epoxy resins useful in the present invention include for example, but are not limited to, bis (2,3-epoxycyclohexyl)ether; the glycidyl and diglycidyl ethers of aliphatic, cycloaliphatic or aromatic polyols; and glycidyl esters of polybasic carboxylic acids. The preferred epoxy resins are based on a bisphenol, and especially bisphenol A, that have been chain-extended to a molecular weight of about 30,000 to about 80,000. To achieve the full advantage of the present invention, the high molecular weight epoxy resin is branched at least at about 3%, and preferably at least at about 4%, of the secondary hydroxyl positions.

One nonlimiting example of an epoxy resin useful in the present invention is ARALDITE ® GZ 488 PMA-32 available from CIBA-GEIGY Corp., Hawthorne, NY. This high molecular weight epoxy resin has provided a useful coating composition that effectively inhibits corrosion of metal substrates. Another useful epoxy resin is SHELL HIGH MOLECULAR WEIGHT EPOXY, available from Shell Chemical Co., Houston, TX. However, a composition including the SHELL HIGH MOLECULAR WEIGHT EPOXY provides a corrosion-inhibiting coating that demonstrates somewhat lower adhesive properties compared to a coating including ARALDITE GZ 488 PMA 32. It has been theorized that this decrease in adhesive properties is related to the lower molecular weight and to the lower amount of branching at the secondary hydroxyl position in the SHELL HIGH MOLECULAR WEIGHT EPOXY.

(b) Phenolic Resin

In addition to the high molecular weight epoxy resin, the corrosion-inhibiting coating composition also includes from about 20% to about 40%, and preferably from about 25% to about 35%, by weight of nonvolatile material as (a), (b) and (c), of a phenolic resin. If the phenolic resin is present in amount below about 20% by weight of nonvolatile material as (a), (b) and (c), then the corrosion inhibiting properties of the composition are adversely affected. Similarly, if the phenolic resin is present in the coating composition in an amount greater than about 40% by weight of nonvolatile material as (a), (b) and (c), then the cured corrosion-inhibiting coating exhibits a decreased flexibility.

Generally, the phenolic resin utilized in the present composition is a condensation product resulting from a reaction between a phenol and formaldehyde, and has a low molecular weight in the range of about 1,000 to about 8,000, and preferably from about 3,000 to about 5,000. Phenol or essentially any other compound including a hydroxyphenyl moiety can be used as the phenol component of the phenolic resin. Nonlimiting examples of suitable phenol compounds include phenol, cresylic acid and bisphenol A. Bisphenol A is the preferred phenol component of the phenolic resin.

To achieve the full advantage of the present invention, a combination of bisphenol A and cresylic acid is used as the phenol component of the phenolic resin. The bisphenol A and cresylic acid are present in the phenolic resin in a weight ratio of bisphenol A to cresylic acid ranging from about 0.25:1 to about 4:1, and especially in a ratio of about 0.6:1 to 1.5:1. The combination of bisphenol A and cresylic acid provides a phenolic resin that, when incorporated into a composition of the present invention, provides a corrosion-inhibiting coating that exhibits excellent adhesion both to the metal substrate and to a variety of topcoats that can be applied over the cured corrosion-inhibiting coating. The cresylic acid component further enhances the corrosion-inhibiting properties of the composition.

An exemplary phenolic resin utilized in the present coating composition includes about 38% by weight bisphenol A, about 38% by weight cresylic acid, and about 24% formaldehyde. Such a phenolic resin is included in the present coating composition as a solution including about 50% by weight of the phenolic resin.

(c) Organic Corrosion Inhibitor

In addition to the epoxy resin and the phenolic resin, the present coating composition also includes from about 1.5% to about 5%, and preferably from about 2% to about 3%, by weight of nonvolatile material as (a), (b) and (c), of an organic corrosion inhibitor. If less than about 1.5% of the organic corrosion inhibitor, by weight of nonvolatile material as (a), (b) and (c), is present in the composition, then the composition, after curing, demonstrates a decreased ability to effectively inhibit corrosion of a metal substrate If the organic corrosion inhibitor is present at above about 5%, by weight of nonvolatile material as (a), (b) and (c), no adverse affects are demonstrated, but corrosion inhibition provided by the coating is not further enhanced, and therefore the amount of organic corrosion inhibitor above about 5% by weight of nonvolatile material as (a), (b) and (c) is wasted.

A useful organic corrosion inhibitor is depicted in general structural formula (I):

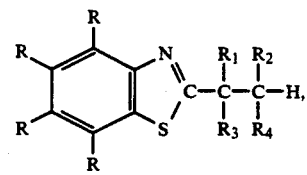

wherein each R is selected, independently, from the group consisting of hydrogen, alkyl, haloalkyl, alkoxy, alkylthio, alkylsulfonyl, cycloalkyl, phenyl, alkylphenyl, phenylalkyl, halo, cyano, nitro, carboxyl, carboxyalkyl, hydroxy, amino, and carbamoyl, and wherein $R_1$, $R_2$, $R_3$ and $R_4$ are selected, independently, from the group consisting of hydrogen, alkyl, hydroxyalkyl, haloalkyl, alkoxyalkyl, carboxyalkyl, carboxyl, phenyl, and phenylalkyl, and wherein at least one of the $R_1$, $R_2$, $R_3$ and $R_4$ groups is a carboxyl group. The compounds of general structural formula (I) are fully disclosed in Berner et al. U.S. Pat. No. 4,612,049, incorporated herein by reference.

A preferred organic corrosion inhibitor of general structural formula (I) includes at least two carboxyl substituents as, and has the general structural formula (II):

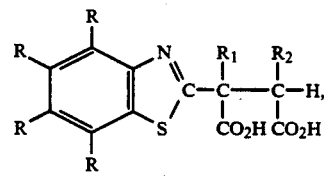

wherein R, $R_1$ and $R_2$ are defined as above for the compound of general structural formula (I). It is envisioned that a compound defined by either general structural formula (I) or (II) is useful in the present corrosion-inhibiting coating composition as long as the organic corrosion inhibitor is soluble in the nonaqueous carrier of the composition, e.g. the nonaqueous carrier is capable of solubilizing from about 0.3% to about 2% by weight of the organic corrosion inhibitor.

To achieve the full advantage of the present invention, the organic corrosion inhibitor included in the present corrosion-inhibiting composition is (2-benzothiazolyl)succinic acid and has the structural formula (III):

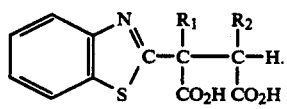

The compound (2 benzothiazolyl)succinic acid is available commercially from CIBA-GEIGY Corp., Hawthorne, NY under the tradename IRGACOR® 252.

It has been theorized that an organic corrosion inhibitor of general structural formula (I) chemically bonds to the epoxy resin and/or phenolic resin during the curing process through the carboxyl groups present on the corrosion inhibiting compound. Extraction studies have shown that, after curing, neither the organic corrosion inhibitor nor a decomposition product of the organic corrosion inhibitor, e.g. 2-mercaptobenzothiazole, is extracted from the corrosion-inhibiting coating, thereby indicating that the organic corrosion inhibitor is incorporated, chemically, into the cured corrosion-inhibiting coating. Such a finding is surprising in light of conventional theories that propound migration of the organic corrosion inhibitor to the metal substrate, followed by formation of a chelate between the metal substrate and the corrosion inhibitor to passivate, or protect, the metal substrate from corrosion.

In addition, by chemically bonding to the epoxy resin and/or phenolic resin, the thermal stability of the organic corrosion inhibitor may be enhanced. 2-(benzothiazolyl)succinic acid is known to be thermally stable up to about 150° C. (302° F.) and to decompose at about 170° C. (338° F.). Therefore, it is surprising that 2-(benzothiazolyl)succinic acid, that was designed for ambient to low temperature curing systems, when incorporated into a composition of the present invention, can withstand prolonged cure times of at least up to one hour at 400° F., and provide a cured coating that demonstrates an excellent ability to inhibit corrosion of a metal substrate.

By incorporating an organic corrosion inhibitor compound of general structural formula (I) into the coating composition in an amount of from about 1.5% to about 5% by weight of nonvolatile material as (a), (b) and (c), the degree of corrosion inhibition provided by the organic corrosion inhibitor is sufficient such that the amount of phenolic resin in the coating composition can be decreased without adversely affecting the corrosion inhibiting properties of the cured corrosion-inhibiting coating. Consequently, by decreasing the amount of phenolic resin present in the corrosion-inhibiting coating composition, the flexibility of the corrosion-inhibiting coating, after curing, is improved, and the coating can withstand extended cure times without adversely affecting this improved flexibility. The improved flexibility of the cured corrosion-inhibiting coating is important because improved coating flexibility also enhances corrosion inhibition. A flexible cured coating remains in continuous and intimate contact with the metal substrate during process steps that form the metal substrate into a metal article, thereby providing better corrosion inhibition.

(d) Nonaqueous Carrier

The present corrosion-inhibiting coating composition is a nonaqueous composition, wherein the epoxy resin, the phenolic resin and the organic corrosion inhibitor are homogeneously dispersed in a suitable nonaqueous carrier. It should be understood that the present coating composition can include a relatively low amount of water, such as up to about 0.5% by total weight of the composition, without adversely affecting the corrosion-inhibiting coating composition, either prior to or after curing. The water can be added to the composition intentionally, or can be present in the composition inadvertently, such as when water is present in a particular component included in the coating composition.

In general, a suitable nonaqueous carrier has sufficient volatility to evaporate essentially entirely from the coating composition during the curing process, such as during heating at about 350° to about 400° F. for about 8 to about 12 minutes. Suitable nonaqueous carriers are known in the art of coating compositions, and include for example, but are not limited to, glycol ethers, like ethylene glycol monomethyl ether, ethylene glycol monoethyl ether, ethylene glycol monobutyl ether, and propylene glycol monomethyl ether; ketones, like cyclohexanone, ethyl aryl ketones, methyl aryl ketones and methyl isoamyl ketone; aromatic hydrocarbons, like toluene, benzene and xylene; aliphatic hydrocarbons, like mineral spirits, kerosene and high flash VM&P naphtha; alcohols, like isopropyl alcohol, n-butyl alcohol and ethyl alcohol; and aprotic solvents, like tetrahydrofuran; chlorinated solvents; esters; glycol ether esters, like propylene glycol monomethyl ether acetate; and combinations thereof.

The nonaqueous carrier usually is included in the composition in a sufficient amount to provide a composition including from about 20% to about 40%, by weight of the composition, of the total weight of (a), (b) and (c). The amount of nonaqueous carrier included in the composition is limited only by the desired, or necessary, rheological properties of the composition. Usually, a sufficient amount of nonaqueous carrier is included in the coating composition to provide a composition that can be processed easily, that can be applied to a metal substrate easily and uniformly, and that is sufficiently removed from the coating composition during curing within the desired cure time.

Therefore, essentially any nonaqueous carrier is useful in the present coating composition as long as the nonaqueous carrier adequately disperses and/or solubilizes the composition components; is inert with respect to interacting with composition components and thereby adversely affecting the stability of the coating composition or the ability of the corrosion-inhibiting coating to inhibit corrosion of a metal substrate; and evaporates quickly, essentially entirely and relatively rapidly to provide a cured corrosion-inhibiting coating that inhibits the corrosion of a metal substrate, demonstrates improved adhesion and demonstrates improved flexibility.

(e) Optional Crosslinking Epoxy Resin

To achieve the full advantage of the present invention, the present coating composition can include, in addition to the high molecular weight epoxy resin, a relatively low amount, such as about 1% to about 4%, and preferably about 2% to about 3%, by weight of nonvolatile matter as (a), (b), (c) and (e), of a low molecular weight polyfunctional epoxy resin to provide a more fully crosslinked coating after curing. An exemplary, but nonlimiting, low molecular weight polyfunctional epoxy resin is the polyfunctional epoxy novolac resin available commercially under the tradename EPN 1139 from CIBA-GEIGY Corporation.

(f) Other Optional Ingredients

A corrosion-inhibiting coating composition of the present invention also can include optional ingredients that do not adversely affect the coating composition or a corrosion-inhibiting coating resulting from curing the corrosion-inhibiting coating composition. Such optional ingredients are known in the art, and are included in the composition to enhance composition esthetics; to facilitate manufacturing, processing, handling and applying the composition; and to further improve a particular functional property of the coating composition or a cured polymeric coating resulting therefrom.

Such optional ingredients include, for example, dyes, pigments, extenders, additional anti-corrosion agents, flow control agents, thixotropic agents, dispersing agents, antioxidants, curing catalysts, adhesion promoters, light stabilizers and combinations thereof. Each optional ingredient is included in a sufficient amount to serve its intended purpose, but not in such an amount that adversely affects the basic corrosion-inhibiting coating composition or a cured polymeric coating resulting therefrom.

A corrosion-inhibiting coating composition of the present invention is prepared by simply admixing the epoxy resin, the phenolic resin, the organic corrosion inhibitor and any optional ingredients, in any desired order, in the nonaqueous carrier, with sufficient agitation. The resulting mixture is admixed until all the composition ingredients are homogeneously dispersed throughout the nonaqueous carrier. Then, an additional amount of the nonaqueous carrier can be added to the corrosion-inhibiting coating composition to adjust the amount of nonvolatile material in the composition to a predetermined level.

To demonstrate the usefulness of the coating compositions of the present invention, the following Examples were prepared, applied to a metal substrate, and then cured to provide a corrosion-inhibiting coating for the metal substrate. The cured corrosion-inhibiting coatings were tested for an ability to inhibit corrosion of a metal substrate, for adhesion to the metal substrate, for intercoat adhesion to a variety of types of topcoats, and for flexibility. The following Example 1 illustrates one important embodiment a composition of the present invention and its method of manufacture.

EXAMPLE 1

| Ingredient | % (by weight of total composition) | % (by weight of nonvolatile material) |
|---|---|---|
| Epoxy Resin[1] | 57.71% | 64.80% |
| Crosslinking Epoxy Resin[2] | 0.77% | 2.70% |
| Phenolic Resin[3] | 17.10% | 30.00% |
| Organic Corrosion Inhibitor[4] | 0.71% | 2.50% |
| Cyclohexanone | 9.72% | |
| Ethylene Glycol Monobutyl Ether | 14.00% | |

[1]ARALDITE ® GZ 488 PMA-32, available from CIBA-GEIGY Corporation, including about 32% by weight of a high molecular weight epoxy resin and about 68% of a combination of propylene glycol monomethyl ether acetate and cyclohexanone to provide about 18.47%, by weight of the total composition of Example 1, of the high molecular weight epoxy resin;
[2]ARALDITE ® EPN 1139, available from CIBA-GEIGY Corporation, including 100% by weight of a polyfunctional epoxy novolac resin;
[3]a phenolic resin, based upon bisphenol A, cresylic acid and formaldehyde, having a weight ratio of bisphenol A to cresylic acid of about 1:1 and including about 50% by weight nonvolatile material in a solvent blend including toluene, deionized water and ethylene glycol monobutyl ether to provide about 8.55%, by weight of the total composition of Example 1, of the phenolic resin; and
[4](1,2-benzothiazolyl)succinic acid, i.e. the compound of structural formula (III), available from CIBA-GEIGY Corp. as IRGACOR ® 252, as a 100% active powder.

The composition of Example 1 was prepared by first admixing a major portion of the cyclohexanone and a major portion of the ethylene glycol monobutyl ether in a vessel to form a nonaqueous carrier mixture. Then, the ARALDITE ® GZ 488 PM-32 was added to the nonaqueous carrier mixture with agitation. Next, the ARALDITE ® EPN 1139, the phenolic resin and the IRGACOR ® 252 each were added, individually, to the resulting mixture, with agitation, until all the composition components were homogeneously dispersed throughout the mixture. Finally, the minor portions of cyclohexanone and ethylene glycol monobutyl ether were added to the homogeneous mixture. After sufficient admixing, a composition of the present invention, including about 28.50% by weight total nonvolatile material, was provided.

A coating composition of the present invention is applied to a metal substrate, then cured for a sufficient time at a sufficient temperature, such as for about 8 to about 12 minutes at about 350° F. to about 400° F., to provide an adherent, crosslinked, corrosion-inhibiting coating on the metal substrate. If the metal substrate is formed into a metal container, no additional topcoats over the cured corrosion-inhibiting coating are required. If the metal substrate is formed into a metal closure for a glass or plastic container, a topcoat is applied over the cured corrosion-inhibiting coating.

Conventionally, for a metal closure, a metal substrate first is coated with a corrosion-inhibiting coating as a primer; next a first topcoat, and usually a vinyl topcoat, is applied over the primer coating; and then, if either desired or if necessary, a second topcoat, also usually a vinyl-based topcoat, is applied over the first topcoat. The first topcoat and, if present, the second topcoat are applied to provide a further coating, or coatings, that inhibit corrosion of the metal substrate; to enhance closure esthetics; and to provide a topcoat having sufficient adhesion to a plastisol composition that finally is applied over the first, or if present, the second topcoat. The plastisol composition is applied over the first or, if present, the second topcoat to provide a leakproof seal whenever the metal closure is engaged on the glass or plastic container.

A major function of the second topcoat is to provide another coating layer that enhances corrosion inhibition of the metal substrate. Conventionally, the primer coating did not have sufficient corrosion-inhibiting properties to adequately protect the metal substrate when only one topcoat was applied over the cured corrosion-inhibiting primer coating. Therefore, two topcoats were necessary. Surprisingly, it has been found that a composition of the present invention, after curing, exhibits sufficient corrosion-inhibiting properties and exhibits sufficient adhesion both (1) to the metal substrate to further help inhibit corrosion, and (2) to a variety of different types of topcoats, thereby obviating the need for the second topcoat. In addition, because the cured corrosion-inhibiting coating provided by a coating composition of the present invention is sufficiently adhesive to a variety of types of topcoats, a particular topcoat can be chosen that also has the ability to adhere to the plastisol.

The corrosion-inhibiting coating composition of Example 1 also provided a cured coating that exhibited improved flexibility compared to cured coatings provided by prior art coating compositions. Flexibility is an important property of a cured polymeric coating because the metal substrate is coated with a primer coating, and topcoats, if any, prior to stamping or otherwise shaping the metal substrate into a desired metal article, such as a metal container or a metal closure for bottles. The plastisol composition, if present, is applied over a topcoat during the stamping process.

The coated metal substrate undergoes severe deformations during the shaping process, and if a coating, and especially the primer coating, lacks sufficient flexibility, the coating can form cracks, or fractures. Such cracks result in corrosion of the metal substrate because the aqueous contents of the container or bottle have greater access to the metal substrate. In addition, a cured corrosion-inhibiting coating provided by a composition of the present invention is sufficiently adhered, and remains sufficiently adhered, to the metal substrate during processing into a metal article, and therefore further enhances corrosion inhibition.

It should be understood that both the flexibility and the adhesion of the cured corrosion-inhibiting coating are related to the amount of phenolic resin included in the corrosion-inhibiting coating composition. If the amount of phenolic resin present in the coating composition is decreased, the flexibility of the cured corrosion-inhibiting coating is improved, but adhesion of the cured coating to the metal substrate, adhesion of the cured coating to a topcoat, and corrosion-inhibiting properties of the cured corrosion-inhibiting coating all are adversely affected. Surprisingly, a corrosion-inhibiting coating composition of the present invention, after curing, demonstrates both excellent flexibility and excellent adhesion, even though a relatively low amount of phenolic resin, e.g. from about 20% to about 40% by weight of nonvolatile material as (a), (b) and (c), is included in the composition. In contrast, present day coating compositions utilize a relatively high amount of phenolic resin, e.g. about 50% to about 60% by weight of nonvolatile material, in order to provide a cured coating having a sufficient balance between flexibility, corrosion-inhibiting properties and adhesion. Present day coating compositions including a relatively low amount of phenolic resin, e.g. about 30% by weight nonvolatile material, have not provided cured coatings having the flexibility, corrosion-inhibiting properties, and adhesive properties demonstrated by a cured coating provided by a composition of the present invention.

As an added advantage, the composition of Example 1 also has been found to withstand cure times of from about 50 to about 60 minutes at about 400° F. without adversely affecting the excellent flexibility characteristics of the cured corrosion-inhibiting coating. In general, the composition of Example 1, after application to a metal substrate, is cured for about 8 to about 12 minutes at about 350° F. to about 400° F. Often, however, at least one topcoat then is applied over the cured corrosion-inhibiting coating, and each topcoat also must be cured at about 350° to about 400° F. for a sufficient time to cure the topcoat. Accordingly, the cured corrosion-inhibiting coating undergoes additional curing periods when each topcoat is cured. If the corrosion-inhibiting coating includes a relatively high amount of phenolic resin, these additional curing periods can lead to a decrease in flexibility of the cured coating.

However, a corrosion-inhibiting coating of the present invention does not demonstrate a loss of flexibility during extended or repeated curing periods because the present composition includes a relatively low amount of phenolic resin. Furthermore, because of the improved corrosion-inhibiting properties and the improved intercoat adhesion demonstrated by a cured corrosion-inhibiting coating provided by a composition of the present invention, only a single topcoat is needed over the cured corrosion-inhibiting coating, and accordingly, the curing period required for the second topcoat is eliminated.

The above described advantages make a coating composition of the present invention useful for application on the interior surface of a variety of metal articles, such as for the interior of vacuum-packed metal containers. The present coating composition is especially useful, after curing, as a corrosion-inhibiting coating on a metal closure for glass or plastic containers that hold food products including volatile acids, such as food products like relishes, pickles and hot peppers.

The compositions of the following Examples 2 through 7 and the Comparative Example were prepared by the general method outlined above in regard to Example 1. The compositions of Examples 1 through 7 and the Comparative Example then were applied to a metal substrate, cured, and the resulting coatings tested for an ability to inhibit corrosion of the metal substrate.

EXAMPLE 2

| Ingredient | % (by weight of total composition) | % (by weight of non-volatile material) |
|---|---|---|
| Epoxy Resin[5] | 65.32% | 65.0% |
| Crosslinking Epoxy Resin[2] | 0.68% | 2.7% |
| Phenolic Resin[3] | 15.00% | 29.8% |
| Organic Corrosion Inhibitor[4] | 0.63% | 2.5% |
| Cyclohexanone | 7.53% | |
| Ethylene Glycol Monobutyl Ether | 10.84% | |

[5] An epoxy resin having a molecular weight of about 30,000 with branching at about 3% of the secondary hydroxyl positions, and including about 25% by weight epoxy resin and about 75% by weight organic carriers, to provide about 16.33% by weight of the total composition of the high molecular weight epoxy resin.

EXAMPLE 3

| Ingredient | % (by weight of total composition) | % (by weight of nonvolatile material) |
|---|---|---|
| Epoxy Resin[6] | 46.10% | 64.7% |
| Crosslinking Epoxy Resin[2] | 0.95% | 2.7% |
| Phenolic Resin[3] | 21.00% | 30.1% |
| Organic Corrosion Inhibitor[4] | 0.88% | 2.5% |
| Cyclohexanone | 12.74% | |
| Ethylene Glycol Monobutyl Ether | 18.33% | |

[6] SHELL HIGH MOLECULAR WEIGHT EPOXY, available from Shell Chemical Co., Houston, TX., having a molecular weight of about 17,000 and modified with a polyol, and including about 49% by weight of a high molecular weight epoxy resin and about 51% by weight organic carriers to provide about 22.59% by weight of the total composition of the high molecular weight epoxy resin.

The compositions of Examples 1–3 each were applied to ten chrome-chrome oxide, tin-free steel panels in a sufficient amount to provide a 25 mg (milligram) of cured corrosion-inhibiting coating per 4 sq. in. (square inches) of steel panel surface. The compositions were cured at 400° F. for about 10 minutes. The panels coated with cured compositions of Examples 1–3 were compared to steel panels coated with a standard commercial coating including 70%, by weight of nonvolatile material, of an epoxy resin and 30%, by weight of nonvolatile material, of an phenolic resin. All panels then were topcoated with an vinyl/phenolic topcoat in an amount of 30 mg. of cured topcoat per 4 sq. in. of panel surface.

Of the ten panels coated with the standard commercial coating, nine panels demonstrated pits or fractures in a metal exposure test. In contrast, only one panel of the ten panels coated with the composition of Example 1, no panels of ten panels coated with the composition of Example 2, and six panels of ten panels coated with the composition of Example 3 demonstrated pits or fractures. Another commercially-available coating composition, after application to tin-free steel panels as described above, also exhibited 9 panels of the 10 coated panels having pits or fractures.

COMPARATIVE EXAMPLE

| COMPARATIVE EXAMPLE | |
|---|---|
| Ingredient | % (by weight non-volatile material |
| Epoxy Resin[7] | 41.8 |
| Crosslinking Epoxy Resin[2] | 2.6 |
| Phenolic Resin[3] | 54.7 |
| Phosphoric Acid (85%) (Catalyst) | 0.9 |

[7]An epoxy resin having a molecular weight of about 30,000, and branched at about 2% to about 3% of the secondary hydroxyl positions.

The compositions of Examples 1 and 2, and of the Comparative Example, were applied to electrolytic tin-plated steel panels (0.25 lb (pound) of tin per 65 lb. of steel). The compositions were cured at 400° F. for about 10 minutes to provide 15 mg. of corrosion-inhibiting coatings provided by the compositions of Examples 1-2 and of the Comparative Example in an amount of 35 mg./4sq. in. of panel surface. The tin-plated steel panels then were formed into a 70 mm (millimeter) diameter closure having a hemispherical indentation with a 0.035 in. (inch) radius.

The five closures coated with the cured composition of the Comparative Example exhibited from 48 to 100 fractures per closure. The five closures coated with the cured composition of Example 2 exhibited no fractures; and of the five closures coated with the cured composition of Example I, two closures showed no fractures, one closure showed one fracture and two closures showed four fractures. Accordingly, the compositions of the present invention, after curing, demonstrated improved adhesion to a metal substrate compared to a cured composition of a standard Comparative Example that includes a relatively high amount of phenolic resin.

The cured compositions of Examples 1 and 2 also were compared to the cured composition of the Comparative Example for an ability to inhibit corrosion. The corrosion-inhibiting coatings provided by the compositions of Examples 1 and 2 showed comparable to better corrosion inhibition than the cured coating provided by the composition of the Comparative Example in exposure tests to 5% acetic acid and to sauerkraut juice vapors, each test conducted at 120° F. In this corrosion test, a topcoat was not applied over the cured corrosion-inhibiting composition. The above two sets of tests show that a present corrosion-inhibiting coating composition, after curing, exhibits excellent adhesion and effectively inhibits corrosion when a phenolic resin is present in a relatively low amount of about 20% to about 40% by weight of nonvolatile material as (a), (b) and (c).

The corrosion-inhibiting coatings provided by the compositions of Examples 1 through 3 also were compared to the cured coating provided by the composition of the Comparative Example when only 7.5 mg. of the cured coating was present per 4 sq. in. of tin-plated steel panel surface. Usually about 15 mg. of cured coating per 4 sq. in. of panel surface is applied for corrosion protection against high acidity products. The composition of the Comparative Example was cured at 400° F. for 10 minutes. The compositions of Examples 1-3 were cured either at 350° or at 400° F. for 10 minutes. The cured coatings provided by the compositions of Examples 1-3 demonstrated a corrosion-inhibiting capability that was comparable to the cured coating provided by the composition of the Comparative Example at both curing temperatures and at the reduced amount of corrosion-inhibiting composition applied to the tin-plated steel substrate. The cured coatings provided by the compositions of Examples 1 through 3 also demonstrated significant improvements in flexibility and adhesion compared to the cured coating provided by the composition of the Comparative Example.

The corrosion-inhibiting coatings provided by the compositions of Examples 1-3 also were compared to a coating provided by the composition of the Comparative Example in blush resistance, plastisol adhesion and flexibility tests. The coatings provided by the inventive compositions compared favorably to, e.g. at least about as good as, the coating provided by the composition of the commercially-available Comparative Example.

A 60 day accelerated corrosion test also was performed on 30 mm metal closures having chrome-chrome oxide tin-free steel as a metal substrate and coated with compositions of Examples 1-3 or with a commercial composition including 70% of an epoxy resin and 30% of a phenolic resin, by weight of nonvolatile material. The compositions were cured on the steel panels at 400° F. for about 10 minutes to provide a panel having a cured coating in an amount of 25 mg. per 4 sq. in. of panel surface. Each panel had a topcoat, in an amount of 30 mg./4 sq. in. of panel surface, applied over the cured corrosion-inhibiting compositions. The panels were then were exposed to a 60 day test wherein the closure were subjected to a 2% acetic acid vapor at 100° F. The closures then were observed and given an empirical overall score determined by depth of pits in the closure, frequency of pits in the closure and general appearance of the closure. The results are tabulated below in TABLE I, wherein a lower overall score indicates better corrosion resistance.

TABLE I

| 60 Day Accelerated Corrosion (2% Acetic Acid Vapor at 100° F.) | |
|---|---|
| Corrosion-Inhibiting Coating Composition | Overall Score |
| Example 3 | −3.52 |
| Example 2 | 0.29 |
| Example 1 | 2.87 |
| Commercial Composition[1] | 3.58[2] |

[1]a composition including 70% epoxy resin and 30% phenolic resin, by weight of nonvolatile material; and
[2]the closures exhibited many perforations.

The data presented in TABLE I show that compositions of the present invention, i.e. the compositions of Examples 1-3, demonstrated improved corrosion inhibition of a metal substrate compared to a present-day commercial composition commonly used to inhibit corrosion.

In addition, a second commercial composition was included in this test. This commercial corrosion-inhibiting composition requires two topcoats, and two topcoats were applied to panels including a coating of this composition. All other panels in this test had only a single topcoat applied over the corrosion-inhibiting coating. The closures coated with the three-coat system exhibited an overall score of −2.83. Accordingly, the composition of Example 3, when used in a two-coat system, imparted better corrosion inhibition properties to a metal substrate than a present-day commercial corrosion-inhibiting composition using a three-coat system. Furthermore, the coatings provided by the compositions of Examples 1-3 demonstrated superior adhesion compared to the coatings provided by each of the commercial compositions.

EXAMPLE 4

| Ingredient | % (by weight of total composition) | % (by weight of nonvolatile material) |
|---|---|---|
| Epoxy Resin[1] | 57.71% | 64.8% |
| Crosslinking Epoxy Resin[2] | 0.77% | 2.7% |
| Phenolic Resin[8] | 17.10% | 30.0% |
| Organic Corrosion Inhibitor[4] | 0.71% | 2.5% |
| Cyclohexanone | 9.72% | |
| Ethylene Glycol Monobutyl Ether | 14.00% | |

[8] A phenolic resin based upon phenol and formaldehyde, including about 50% by weight nonvolatile material to provide about 8.55% by weight of the total composition of the phenolic resin.

EXAMPLE 5

| Ingredient | % (by weight of total composition) | % (by weight of nonvolatile material) |
|---|---|---|
| Epoxy Resin[1] | 57.71% | 64.8% |
| Crosslinking Epoxy Resin[2] | 0.77% | 2.7% |
| Phenolic Resin[9] | 17.10% | 30.0% |
| Organic Corrosion Inhibitor[4] | 0.71% | 2.5% |
| Cyclohexanone | 9.72% | |
| Ethylene Glycol Monobutyl Ether | 14.00% | |

[9] A phenolic resin based upon bisphenol A, cresylic acid and formaldehyde, having a bisphenol A to cresylic acid weight ratio of about 0.6:1 and including about 50% by weight nonvolatile material, to provide about 8.55% by weight of the total composition of the phenolic resin.

EXAMPLE 6

| Ingredient | % (by weight of total composition) | % (by weight of nonvolatile material) |
|---|---|---|
| Epoxy Resin[1] | 57.71% | 64.8% |
| Crosslinking Epoxy Resin[2] | 0.77% | 2.7% |
| Phenolic Resin[10] | 17.10% | 30.0% |
| Organic Corrosion Inhibitor[4] | 0.71% | 2.5% |
| Cyclohexanone | 9.72% | |
| Ethylene Glycol Monobutyl Ether | 14.00% | |

[10] A phenolic resin based upon cresylic acid and formaldehyde, including about 50% by weight nonvolatile material to provide about 8.55% by weight of the total composition of the phenolic resin.

EXAMPLE 7

| Ingredient | % (by weight of total composition) | % (by weight of nonvolatile material) |
|---|---|---|
| Epoxy Resin[1] | 57.71% | 64.8% |
| Crosslinking Epoxy Resin[2] | 0.77% | 2.7% |
| Phenolic Resin[11] | 17.10% | 30.0% |
| Organic Corrosion Inhibitor[4] | 0.71% | 2.5% |
| Cyclohexanone | 9.72% | |
| Ethylene Glycol Monobutyl Ether | 14.00% | |

[11] A phenolic resin based on bisphenol A and formaldehyde, including about 50% by weight nonvolatile material to provide about 8.55% by weight of the total composition of the phenolic resin.

The compositions of Example 1 and Examples 4 through 7 were prepared, then compared for an ability to inhibit corrosion of a metal substrate. Each composition, after curing, demonstrated an ability to inhibit corrosion. However, the cured coatings provided by the composition of Example 4, including only phenol as the phenol component of the phenolic resin, and the cured composition of Example 7, including only bisphenol A as the phenol component of the phenolic resin, demonstrated a decreased ability to inhibit corrosion compared to the cured coatings provided by the compositions of Examples 1, 5 and 6, each including cresylic acid in the phenol component of the phenolic resin.

Obviously, many modifications and variations of the invention as hereinbefore set forth can be made without departing from the spirit and scope thereof and therefore only such limitations should be imposed as are indicated by the appended claims.

What is claimed is:

1. A metal article having at least one surface thereof coated with an adherent layer of a corrosion-inhibiting coating, said corrosion-inhibiting coating comprising:
   (a) from about 55% to about 78.5%, by weight, of an epoxy resin having a molecular weight of about 15,000 to about 80,000;
   (b) from about 20% to about 40%, by weight, of a phenolic resin; and
   (c) from about 1.5% to about 5%, by weight, of an organic corrosion inhibitor having the structural formula:

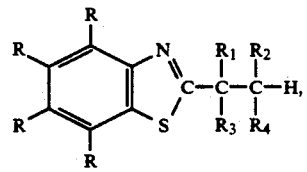

wherein each R is selected, independently, from the group consisting of hydrogen, alkyl, haloalkyl, alkoxy, alkylthio, alkylsulfonyl, cycloalkyl, phenyl, alkylphenyl, phenylalkyl, halo, cyano, nitro, carboxyl, carboxyalkyl, hydroxy, amino, and carbamoyl, and wherein $R_1$, $R_2$, $R_3$ and $R_4$ are selected, independently, from the group consisting of hydrogen, alkyl, hydroxyalkyl, haloalkyl, alkoxyalkyl, carboxyalkyl, carboxyl, phenyl, and phenylalkyl, and wherein at least one of the $R_1$, $R_2$, $R_3$ and $R_4$ groups is a carboxyl group.

2. The metal article of claim 1 wherein the corrosion-inhibiting coating further comprises:
   (d) from about 1% to about 4%, by weight, of a low molecular weight polyfunctional epoxy resin.

3. The metal article of claim 1 wherein the epoxy resin is branched at least at about 3% of secondary hydroxyl positions of the epoxy resin.

4. The metal article of claim 1 wherein the epoxy resin has a molecular weight of about 30,000 to about 80,000.

5. The metal article of claim 11 wherein the phenolic resin has a molecular weight of about 1,000 to about 8,000.

6. The metal article of claim 1 wherein the phenolic resin includes a phenol component selected from the group consisting of phenol, bisphenol A, cresylic acid, and combinations thereof.

7. The metal article of claim 1 wherein the phenolic resin includes a phenol component comprising bisphenol A and cresylic acid, wherein the bisphenol A and the cresylic acid are present in a weight ratio of bisphenol A to cresylic acid of about 0.25:1 to about 4:1.

8. The metal article of claim 1 wherein the organic corrosion inhibitor has the structural formula:

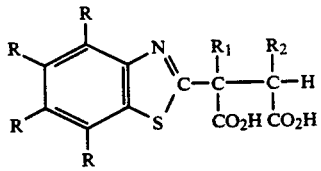

9. The metal article of claim 1 wherein the organic corrosion inhibitor has the structural formula:

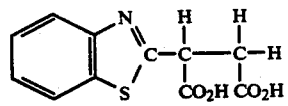

10. The metal article of claim 1 wherein the corrosion-inhibiting coating comprises:
   (a) from about 60% to about 70%, by weight, of the epoxy resin, said epoxy resin having a molecular weight of about 40,000 to about 75,000, and said epoxy resin branched at least at about 4% of the secondary hydroxyl positions of the epoxy resin;
   (b) from about 25% to about 35%, by weight, of the phenolic resin, said phenolic resin having a molecular weight of about 3,000, and said phenolic resin having a phenol component comprising bisphenol A and cresylic acid, wherein the bisphenol A and cresylic acid are present in a weight ratio of about 0.6:1 to about 1.5:1; and
   (c) from about 2% to about 3%, by weight, of the organic corrosion inhibitor, said organic corrosion inhibitor having the structural formula:

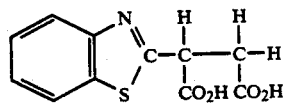

11. The metal article of claim 10 wherein the corrosion-inhibiting coating further comprises:
   (d) from about 2% to about 3%, by weight, of a low molecular weight polyfunctional epoxy resin.

* * * * *

UNITED STATES PATENT AND TRADEMARK OFFICE
CERTIFICATE OF CORRECTION

PATENT NO. : 5,244,738
DATED : September 14, 1993
INVENTOR(S) : Lawrence P. Seibel It is certified that error appears in the above-indentified patent and that said Letters Patent is hereby corrected as shown below:

Col. 8, lines 50-55, in the formula (III),
  delete "$R_1$" and insert therefor -- H --.
  delete "$R_2$" and insert therefor -- H --.

Col. 15, line 21,
  after "corrosion-inhibiting" insert
  -- coating per 4 sq. in. of panel surface.
     An vinyl/phenolic topcoat was applied over
     the corrosion-inhibiting --.

Col. 15, line 35
  delete "tractures", and insert therefor -- fractures --.

Col. 19, claim 5, line 1,
delete "11" should read --1--

Col. 20, claim 10, line 10,
  after "3,000" insert
  -- to about 5,000 --.

Signed and Sealed this

Fourteenth Day of June, 1994

*Attest:*

BRUCE LEHMAN

*Attesting Officer*      Commissioner of Patents and Trademarks